(No Model.)
L. HILL.
FASTENING FOR CORSETS.
No. 311,986. Patented Feb. 10, 1885.
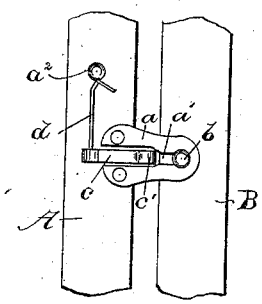
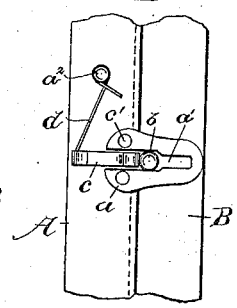
Witnesses.
Henry Marsh.
Bernice J. Noyes.
Inventor,
Lucian Hill.
by Crosby & Gregory
attys.

UNITED STATES PATENT OFFICE.

LUCIAN HILL, OF NORTH BROOKFIELD, MASSACHUSETTS, ASSIGNOR TO THEODORE C. BATES, OF SAME PLACE.

FASTENING FOR CORSETS.

SPECIFICATION forming part of Letters Patent No. 311,986, dated February 10, 1885.

Application filed May 26, 1884. (No model.)

*To all whom it may concern:*

Be it known that I, LUCIAN HILL, of North Brookfield, county of Worcester, State of Massachusetts, have invented an Improvement in Fastenings for Corsets, of which the following description, in connection with the accompanying drawings, is a specification, like letters on the drawings representing like parts.

This invention has for its object the production of a corset-fastening in which a headed stud secured to one steel is held in engagement with a slotted plate fastened to a second corset-steel by means of a longitudinally-movable follower, arranged in connection with the slotted plate and adapted to retain the headed stud in a portion of the slot in the plate narrower than the head of the stud.

My invention is fully set forth in the following description and particularly pointed out in the claims.

Figure 1 is an elevation showing the parts in locked position; Fig. 2, a similar view showing the follower forced back by the headed stud, and with the latter in the enlarged portion of the slot in the plate which admits the head of the stud.

In the present instance the plate $a$, which is secured to the corset-steel A, is provided with a slot, $a'$, extending from near the free or front end of the plate backward through said plate, giving thereto a more or less U form. This slot is enlarged at about the center of the plate to readily admit the headed stud $b$, fastened to the steel B, while the forward part of said slot is of a width to permit easy movement therein of the post of the stud, but prevent the escape of the head. The follower $c$, having preferably a blunt or enlarged head, $c'$, is held in the rear portion of the slot, the plate serving as a guide thereto, and is attached to the actuating-spring $d$, fastened in this instance to the steel A by a pin, $a^2$, the said spring holding the follower $c$ in the slot and keeping it in advanced position to prevent the escape of the headed stud backward from the narrowed front portion of the slot. The parts are fastened by causing the stud to engage the head of the follower and force it backward against the pressure of the spring until the head of the stud can be projected through the enlarged central portion of the slot, when the actuating-spring will cause the follower to push the stud into the rearward front portion of the slot and hold it therein, as will be clearly understood by reference to the drawings.

I claim—

1. A fastening for corsets, consisting of a plate having a slot adapted at one part to permit the entrance of a headed stud and at another or forward part to prevent the escape of such headed stud, and an automatic follower adapted to move longitudinally with relation to the said slot, and operating in connection with the slotted plate to follow up and force the stud into the narrowed front portion of the slot and retain it in such position, as and for the purpose set forth.

2. A fastening for corset-steels, consisting of a slotted plate to permit the entrance therein of a headed stud and a follower, and a spring to reciprocate it in the direction of the length of the said plate, the said follower acting to retain the headed stud in the said slot, substantially as set forth.

In testimony whereof I have signed my name to this specification in the presence of two subscribing witnesses.

LUCIAN HILL.

Witnesses:
F. W. RUGGLES,
H. H. FAIRBANKS.